United States Patent
Goetz et al.

(10) Patent No.: US 9,688,160 B2
(45) Date of Patent: Jun. 27, 2017

(54) OPERATING METHOD FOR AN ELECTRIC ENERGY SYSTEM OF A MOTOR VEHICLE COMPRISING A FUEL CELL SYSTEM, AN ACCUMULATOR AND AN ELECTRIC MOTOR

(71) Applicant: Bayerische Motoren Werke Aktiengesellschaft, Munich (DE)

(72) Inventors: Georg Goetz, Steinkirchen (DE); Sylvester Burckhardt, Kirchseeon (DE); Michael Bauer, Unterfoehring (DE); Andreas Buchner, Steinebach (DE); Florian Pfattrisch, Geretsried-Gelting (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 565 days.

(21) Appl. No.: 14/224,824

(22) Filed: Mar. 25, 2014

(65) Prior Publication Data

US 2014/0203636 A1    Jul. 24, 2014

Related U.S. Application Data

(63) Continuation of application No. PCT/EP2012/065024, filed on Aug. 1, 2012.

(30) Foreign Application Priority Data

Sep. 26, 2011   (DE) .................. 10 2011 083 453

(51) Int. Cl.
*B60L 11/18* (2006.01)
*B60L 7/10* (2006.01)
(Continued)

(52) U.S. Cl.
CPC ............ *B60L 11/1887* (2013.01); *B60L 7/10* (2013.01); *B60L 11/1862* (2013.01);
(Continued)

(58) Field of Classification Search
CPC .................................................. B60L 11/1887
See application file for complete search history.

(56) References Cited

U.S. PATENT DOCUMENTS 5,469,816 A * 11/1995 Murakawa ............. B60K 6/485
                                                       123/2
5,519,312 A *  5/1996 Wang ..................... H01F 6/00
                                                      323/360

(Continued)

FOREIGN PATENT DOCUMENTS

CN        1439178 A      8/2003
DE    199 23 738 A1    11/2000
(Continued)

OTHER PUBLICATIONS

International Search Report dated Mar. 12, 2013 with English translation (seven (7) pages).
(Continued)

*Primary Examiner* — Jeffrey Shin
(74) *Attorney, Agent, or Firm* — Crowell & Moring LLP

(57) ABSTRACT

A method of operating an electric system of a motor vehicle, consisting of a fuel cell system, an accumulator and an electric driving motor is provided. Without implementing an electric voltage conversion and therefore without an electric voltage converter, as a function of the level of the electric voltage made available by the fuel cell system and by the accumulator and the electric power demanded by the electric motor, a first switching element in the connection between the fuel cell system and a node point electrically connected with the accumulator and the electric motor, as well as a (Continued)

second switching element in the connection between the accumulator and this node point are opened or closed as needed. This is done such that the power requirement of the electric motor is met primarily from the fuel cell system, and in an auxiliary fashion, additionally from the accumulator. If the electric power offered by the fuel cell system exceeds the electric power demanded by the electric motor, the excess power will be fed to the accumulator for as long as its permissible charging current is not exceeded and the accumulator still has a defined residual storage capacity.

12 Claims, 2 Drawing Sheets

(51) Int. Cl.
| | |
|---|---|
| *H01M 8/04858* | (2016.01) |
| *H01M 10/46* | (2006.01) |
| *H01M 16/00* | (2006.01) |
| *H01M 8/04089* | (2016.01) |
| *H01M 8/0438* | (2016.01) |
| *H01M 8/04537* | (2016.01) |
| *H01M 8/04791* | (2016.01) |

(52) U.S. Cl.
CPC ....... *B60L 11/1883* (2013.01); *B60L 11/1898* (2013.01); *H01M 8/0488* (2013.01); *H01M 8/04097* (2013.01); *H01M 8/04395* (2013.01); *H01M 8/04544* (2013.01); *H01M 8/04798* (2013.01); *H01M 10/46* (2013.01); *H01M 16/006* (2013.01); *B60L 2240/423* (2013.01); *Y02T 10/642* (2013.01); *Y02T 10/705* (2013.01); *Y02T 10/7044* (2013.01); *Y02T 90/34* (2013.01)

(56) References Cited

U.S. PATENT DOCUMENTS

| | | | |
|---|---|---|---|
| 6,380,638 B1 * | 4/2002 | Bitsche | ............... B60L 11/1881 290/1 R |
| 6,406,806 B1 | 6/2002 | Keskula et al. | |
| 6,472,091 B1 | 10/2002 | Konrad et al. | |
| 6,972,159 B2 * | 12/2005 | Autenrieth | ........ H01M 8/04097 204/DIG. 4 |
| 7,588,847 B2 | 9/2009 | Maier et al. | |
| 8,373,381 B2 | 2/2013 | Raiser et al. | |
| 2006/0166050 A1 | 7/2006 | Autenrieth | |
| 2007/0222413 A1 | 9/2007 | Kinoshita et al. | |
| 2009/0105895 A1 | 4/2009 | Shige | |

FOREIGN PATENT DOCUMENTS

| | | |
|---|---|---|
| DE | 100 55 291 A1 | 5/2001 |
| DE | 102 61 418 A1 | 7/2004 |
| DE | 10 2007 026 329 A1 | 12/2007 |
| DE | 11 2006 000 895 T5 | 5/2008 |
| EP | 1 286 405 A1 | 2/2003 |

OTHER PUBLICATIONS

German Search Report dated Apr. 12, 2012 with English translation (ten (10) pages).

Chinese-language Office Action issued in counterpart Chinese Application No. 201280039540.X dated Dec. 31, 2015 with English translation (Twelve (12) pages).

* cited by examiner

OPERATING METHOD FOR AN ELECTRIC ENERGY SYSTEM OF A MOTOR VEHICLE COMPRISING A FUEL CELL SYSTEM, AN ACCUMULATOR AND AN ELECTRIC MOTOR

CROSS REFERENCE TO RELATED APPLICATIONS

This application is a continuation of PCT International Application No. PCT/EP2012/065024, filed Aug. 1, 2012, which claims priority under 35 U.S.C. §119 from German Patent Application No. 10 2011 083 453.2, filed Sep. 26, 2011, the entire disclosures of which are herein expressly incorporated by reference.

BACKGROUND AND SUMMARY OF THE INVENTION

The invention relates to an operating method of an electric-energy generating, -providing and -consuming system of a motor vehicle, consisting of a fuel cell system having at least one hydrogen (air) oxygen fuel cell, an accumulator and an electric motor acting, in particular, as a vehicle driving motor. By the interposition of switching elements, these components are electrically coupled in such a manner that the fuel cell system can supply the electric motor as well as the accumulator with electric energy, and the accumulator can supply the electric motor with electric energy.

Conventional electric motor vehicle systems having a fuel cell system for generating electric energy, an accumulator for storing energy and an electric motor, which is fed from these above-mentioned elements, for driving the motor vehicle, have an electric voltage converter (in the form of a dc/dc converter), connected on the output side of the fuel cell system. The voltage converter transforms the electric voltage level of the fuel cell system to the normal voltage level of the high-performance onboard power supply system of the vehicle, i.e. to the voltage level of the accumulator as well as of the electric motor, which may, for example, be in the order of 150 V. As a function of the further development or of the operating principle of the electric motor acting as the driving motor, an inverter can be connected to the input side of the electric motor, which inverter transforms the direct current of the fuel cell system as well as of the accumulator to alternating current, in the process, however, changing the voltage level only insignificantly.

Since an electric voltage converter mentioned in the preceding section has to be designed for the maximal output power of the fuel cell system or at least for the maximal consuming power of the electric vehicle driving motor, it is a high-expenditure component which requires a large installation space, has a high weight and should not be necessary.

It is an object of the present invention to provide a measure for eliminating an electric voltage converter for the operation of an electric energy system of a motor vehicle.

The solution of this task is characterized in that, by a design of the system such that the accumulator can essentially be charged completely by the fuel cell system alone, as well as by the electric motor operating as a generator alone, without the implementation of an electric voltage conversion and therefore without providing an electric voltage converter, as a function of the level of the electric voltage provided by the fuel cell system and of the electric voltage level offered by the accumulator and the electric power demanded by the electric vehicle driving motor, a first switching element in the electric connection between the fuel cell system and a node point electrically connected with the accumulator and the electric motor as well as a second switching element in the connection between the accumulator and the above-mentioned node point are opened or closed as needed, i.e. are moved into a position not permitting a flow of current or into a position permitting the flow of current. The "concrete" meaning of "as needed" is that the electric power requirement of the electric motor is met primarily from the fuel cell system and, in an auxiliary fashion, additionally from the accumulator, and that, if the electric power made available from the fuel cell system, recognizable by its voltage level, exceeds the electric power demanded by the electric motor, the excess power of the fuel cell system resulting from the difference between available amount and the demand will be fed to the accumulator for as long as the maximally permissible charging current of the accumulator is not exceeded and the accumulator still has a residual storage capacity at least in the amount of the kinetic energy of the motor vehicle that can be fed to the accumulator in the current driving state of the vehicle by recuperation by way of the electric motor operating as a generator.

By means of the characteristics according to the invention, an operating strategy of a system of the above-mentioned type, which can be implemented by an electronic control unit, or a switching strategy for the above-mentioned switching elements, is provided, which makes it possible to operate the fuel cell system with high efficiency without a voltage conversion and therefore also without the use of an electric voltage converter and to simultaneously also minimize stressing of the accumulator by conditions which reduce its service life. For this purpose, the fuel cell system is designed such that its electric nominal voltage, i.e. the height of the providable voltage level is greater than the electric (nominal) voltage of the completely charged accumulator. The latter can thereby essentially be charged completely, i.e. fully, by the fuel cell system as well as the electric motor, when the electric motor is operated as a generator. In this case, the electric motor acting as a vehicle driving motor will then be operated as a generator and therefore be driven by the motor vehicle, when this motor vehicle is braked, i.e. its kinetic energy is to be reduced. The kinetic energy of the motor vehicle can thereby be recuperated (reduced by the conversion losses) and can be intermediately stored in the accumulator.

By this operating strategy, the basic supply of the electric motor is covered by the fuel cell system, and only the peak demand of the electric motor is additionally covered from the accumulator. An electronic control unit can recognize, by means of the voltage level provided by the fuel cell system, whether such a peak demand exists, and then additionally connect the accumulator for supplying the electric motor. It is thereby achieved that the accumulator experiences no unnecessary charging and discharging cycles, which would significantly reduce its service life and efficiency The accumulator is recharged primarily by recuperation, which is why, according to the invention, an additional charging of the accumulator by the fuel cell system, if the latter is, recognizably by an electronic control unit, capable of doing so on the basis of a correspondingly low power demand by the electric motor, will be implemented only until the accumulator still has a residual storage capacity, which can accommodate at least the kinetic energy existing in the current driving state of the motor vehicle in the form of recuperated electric energy.

In addition, in the case of the charging of the accumulator by the fuel cell system, it is taken into account that the electric charging current at the accumulator should be lower than the charging current maximally permissible for this accumulator. If the last-mentioned criterion cannot be met or if the accumulator is already sufficiently charged, which an electronic control unit can determine by way of its voltage level, the electric connection between the fuel cell system and the accumulator will be interrupted by the suitable switching element. If, in this case, the electric motor also demands no power, the fuel cell system will automatically move to idle operation because of a lack of power consumption; when power is demanded by the electric motor, the fuel cell system will then automatically supply only as much power as is demanded.

The above-mentioned electronic control unit, which executes the operating method according to the invention, preferably controls the above-mentioned switching elements such that the charging state of the accumulator is kept in a range favorable with respect to its service life and efficiency during charging and discharging, which range may preferably be in the order of from 30% to 80%. Naturally, the electronic control unit, when activating the above-mentioned switching elements, will further take into account that no electric current originating from the accumulator or from the electric motor operating as a generator, can arrive in the fuel cell system. For this purpose, the voltage level, which is currently present at the node mentioned above, is compared with the voltage level provided by the fuel cell system. If the latter is not higher than the voltage level at the above-mentioned node, the electric connection between the fuel cell system and the above-mentioned node has to be interrupted or will be interrupted by opening or keeping open the switching element provided in this connection.

The possibilities contained in this operating strategy described so far (and in the following description of the figures with the amendments) can be considerably expanded by a targeted influencing of the voltage level provided by the fuel cell system. If this provided voltage level is significantly higher than the voltage level that can be processed by the electric motor together with the accumulator while taking into account the conditions which were mentioned above and limit the charging of the accumulator by the fuel cell system to certain cases, the voltage level of the fuel cell system can be adapted to the demand by the modulation of the oxygen content, specifically the lowering of the oxygen content, on the cathode side of the fuel cell(s). The efficiency of the fuel cell system is thereby not significantly impaired. The corresponding situation applies when the electric voltage level provided by the fuel cell system is significantly lower than the voltage level demanded by the electric motor or by the accumulator while taking into account the above mentioned conditions which limit the charging of the accumulator by the fuel cell system to certain cases. Then, the voltage level of the fuel cell system can be adapted to the demand by modulation and here by raising of the oxygen content on the cathode side of the fuel cell(s).

The oxygen content can correspondingly be modulated on the cathode side of the fuel cell(s) of the fuel cell system by suitable measures at the air flow fed to the fuel cell system or to the cathode sides of the fuel cells. When this air flow is mixed with a portion of the exhaust gas flow of the fuel cell system having a considerably reduced oxygen content, the oxygen content of the fed air flow will naturally drop. Therefore, for the lowering of the voltage level of the fuel cell system, as required, the rate of fuel cell exhaust gas returned to the cathode side of the fuel cell(s) can be changed. However, the air throughput on the cathode side of the fuel cell(s) can also be changed directly, but such a change has limits, in which case the fuel cell system could be damaged when there is a falling-below those limits. An increase of the oxygen content of the air flow supplied to the cathode side of the fuel cell(s) for raising the voltage level of the fuel cell system, as required, can take place by adding oxygen from a suitable short-term storage device for oxygen, for example, in the form of a zeolite, which had previously been filled with oxygen from fed air. As an alternative or in addition, by use of a molecular sieve or the like, the nitrogen fraction in the air flow supplied to the fuel cell system can be reduced, whereby the oxygen fraction in this air flow will necessarily be increased.

Finally, the method continuously monitors the electric voltage of all or each individual fuel cell(s) of the fuel cell system with respect to observing the limit values permissible for the latter and to prevent an exceeding or falling-below these limit values by changing the fed fuel quantity.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
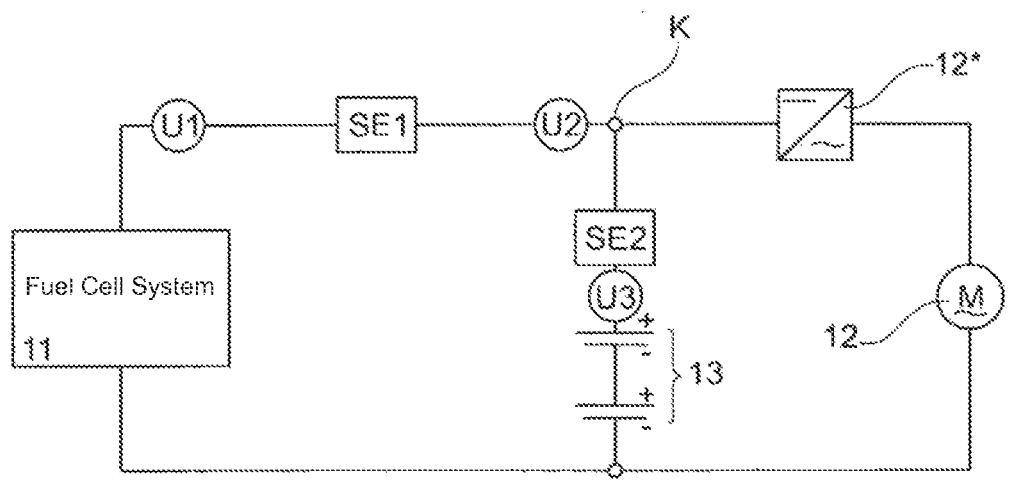
FIG. 1 is an exemplary schematic electric circuit diagram, limited to the most essential aspects, for illustrating the present invention.

Referring to FIG. 1, in this electric circuit diagram, the fuel cell system has the reference number 11; an accumulator consisting here of two electric batteries connected in series has the reference number 13, and an electric vehicle driving motor, also called electric motor, has the reference number 12. An inverter 12* is connected to the input side of the electric motor and converts the electric direct current provided by the fuel cell system 11 or by the accumulator 13 to alternating current. In the above general description, such an inverter 12* is mentioned only briefly because it is not essential to the invention but is necessary only when a corresponding electric motor 12 operated with alternating current is used. Therefore, when such an alternating-current electric motor is used, this electric motor 12 quasi-forms a unit with the inverter connected to the input side, so that, particularly in the above-indicated introduction to the specification but also in the following description of the figures, the term "electric motor with an inverter connected to the input side" may also be used instead of the term "electric motor".

The electric output side and thereby also the "positive terminal" of the fuel cell system 11, with the interconnection of a first switching element SE1, is connected with the inverter 12* and thus with the electric input side of the electric motor 12. The electric voltage level U1 made available by the fuel cell system 11 is therefore present (at least when the switching element SE1 is open) between the fuel cell system 11 and the first switching element SE1. Also, the electric output side and thus the positive terminal of the accumulator 13, with the interconnection of a second switching element SE2, is connected with the inverter 12* and thus with the electric input side of the electric motor 12.

The electric voltage level U3 made available by the accumulator 13 is therefore present between the accumulator 13 and the second switching element SE2 (at least when the switching element SE2 is open). In an electric node K, which is situated in front of the inverter 12* or in front of the electric motor 12, the connection lines between the fuel cell system 11 and the electric motor 12, as well as between the accumulator 13 and the electric motor 12, are combined into a single connection line, in which case, the respective switching element SE1 and SE2 are situated on the side of the node K upstream from the electric motor 12 (or the inverter 12*) in the respective connection line.

The two switching elements SE1, SE2 may be closed or open, i.e. they may establish or interrupt a connection between the elements connected by way of the illustrated electric connection lines with the two sides of the respective switching element SE1 and SE2, respectively. Naturally, by way of further electric lines, a closed electric circuit is represented, so that the other so-called "negative" terminal of the fuel cell system 11 as well as the negative terminal of the accumulator 13 is connected with the output side of the electric motor 12. As a function of the amount of the electric voltage level U1, U3 as well as the power of the electric motor 12 for electric energy and the switching position of the two switching elements SE1, SE 2, a certain voltage level U2 will occur at the node K or at the input side of the electric motor 12, more precisely, here at the input side of the inverter 12*.

Explicitly, no electric voltage converter is provided in the present electric circuit arrangement according to FIG. 1. In the conventional state of the art, such an electric voltage converter is situated in the location of the first switching element SE1, and in the conventional state of the art, the two switching elements SE1, SE2 are not present in this fashion, or, in the state of the art possibly present switching elements are not operated in the manner according to the invention. An absence of such an electric voltage converter is made possible by the operating method according to the invention when the fuel cell system 11, the accumulator 13 as well as the electric motor 12 (possibly with the inverter 12*) are designed with respect to their electric nominal voltage such that the accumulator 13 as can be charged essentially completely by the fuel cell system 11 as well as by the electric motor 12 operating as a generator, and when the switching elements SE1, SE2, as required, are switched in a suitable manner. Furthermore, the electric internal resistance of the fuel cell system 11 and thus the load-dependent voltage level U1 provided by the fuel cell system can be adjustable by the variation of the oxygen content on the cathode side of the fuel cell of the fuel cell system 11, which will be discussed in greater detail in connection with FIG. 2.

By way of a first operating mode of the operating method according to the invention explained in reference to FIG. 1, the electric motor 12 is supplied with electric energy by the fuel cell system 11 alone, without requiring support by the accumulator 13. In this first operating mode, the first switching element SE1 is closed and the second switching element SE2 is open, whereby the accumulator 13 is decoupled.

By way of a second operating mode of the operating method according to the invention, the electric motor 12 acting as the vehicle drive motor is supplied with electric energy by the fuel cell system 11 as well as by the accumulator 13, if the fuel cell system 11 is incapable of satisfying the demand of the electric motor 12 for electric energy. In this second operating mode, the first switching element SE1 is closed continuously and the second switching element SE2 is closed at any rate as long as the electric voltage levels U2 and U3 are at least approximately at the same height.

By way of a third operating mode of the operating method according to the invention, the electric motor is supplied with electric energy by the fuel cell system alone, and the fuel cell system 11 further provides additional electric energy, which can be stored in the accumulator 13; i.e. the accumulator 13 can be additionally charged. However, this should take place only when, or only as long as, the accumulator 13 still has a certain residual storage capacity. The accumulator 13 is therefore not filled up completely by the fuel cell system 11, at least when a further energy potential is present which could be fed to the accumulator 13. This further energy potential is primarily formed by the kinetic energy of the motor vehicle equipped with this system. When this moving vehicle is to be braked, this will take place, if possible, while recuperating the kinetic energy, for which the electric motor 12 acting upon the vehicle drive is operated as a generator. The electric energy generated during the resulting braking of the vehicle in the generator or electric motor 12 is to be fed to the accumulator 13. For this to be possible, the accumulator 13 should not be completely charged, and will therefore be charged in this third operating mode by the fuel cell system 11 only to such an extent that the kinetic energy currently present in the vehicle, possibly taking into account the conversion losses, can be stored as electric energy in the accumulator 13. Therefore, as long as the first switching element SE1 is continuously closed, and the second switching element SE2 is closed at least as long as the difference of the electric voltage level U2 and U3 is not so high that the maximally permissible charging current of the accumulator 13 is exceeded. In contrast, should the difference between the voltage level U2 at the node K and the voltage level U3 of the accumulator 13 be higher or so high that the charging current maximally permissible for the accumulator 13 would be exceeded, the second switching element SE2 will be opened for the protection of the accumulator 13.

A fourth operating mode was already briefly mentioned in the preceding paragraph, specifically the recuperation of kinetic energy of the vehicle, which is converted to electric energy in the electric motor 12 operated as a generator, is subsequently rectified in the inverter 12*, if present and required, and is then fed to the accumulator 13 which, because of the strategy of the third operating mode described in the preceding paragraph still has sufficient capacity and storage capability for this amount of energy. In this fourth operating mode, the first switching element SE1 will be open and the second switching element SE2 will be closed.

By way of a fifth operating mode of the operating method according to the invention, while the electric motor 12 has stopped, the fuel cell system 1 provides electric energy which, in the case of a circuit arrangement limited to the essential elements, according to the present FIG. 1, is stored completely in the accumulator 13. In a real system installed in a motor vehicle, a portion of the electric energy obtained in the fuel cell system 11 can, however, also be used for arbitrary electric auxiliary loads of the vehicle. In this fifth operating mode, the first switching element SE1 and the second switching element SE2 will be closed, but this can also only be so as long as the resulting electric charging current for the accumulator 13 is lower than its maximally permissible charging current. If this is not guarantied, the second switching element SE2 has to be opened, after which the fuel cell system 11 reaches its idling operation.

For example, in the event that, particularly in the above-mentioned fifth operating mode, because of a high voltage difference between the voltage level U1 (when the first switching element SE1 is open), and the voltage level U3 (when the second switching element SE2) is open, a prohibitively high charging current would occur from the charging current of the fuel cell system 11 to the accumulator 13 (when the switching elements SE1 and SE2 are closed), the voltage level U1 provided by the fuel cell system 11 can also be lowered to such an extent that the then occurring charging current will remain below the above-mentioned limit value. Such a lowering of the voltage level U1 of the fuel cell system 11 can be represented by change, concretely by the reduction of the oxygen content on the cathode sides of the individual fuel cells of the fuel cell system 11. Preferably, such an adaptation of the voltage level U1 according to the demand or of the terminal voltage of the fuel cell system 11 takes place by changing the rate of exhaust gas recirculated to the cathode side from its individual fuel cells and/or by changing the air throughput at the above-mentioned cathode sides.

Figure 2:
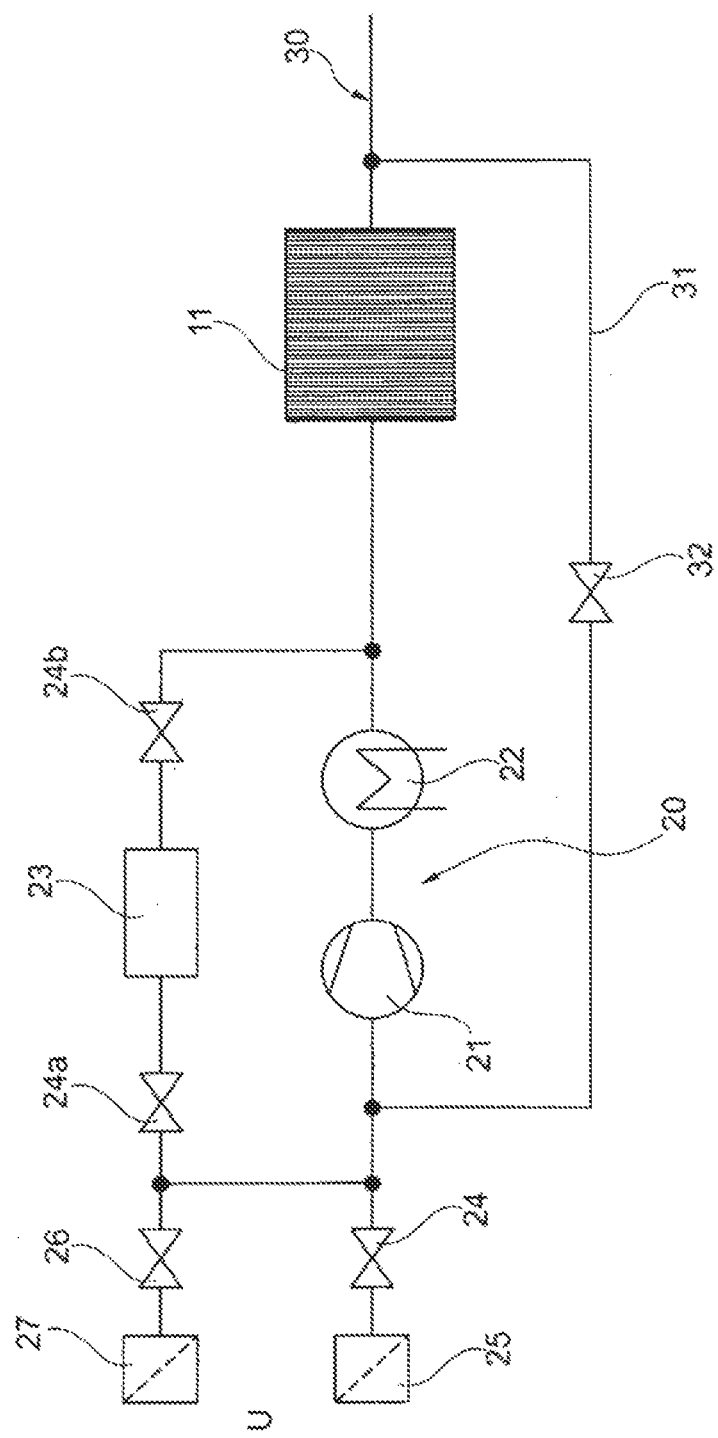
FIG. 2 is a schematic diagram illustrating various possibilities for modulating the oxygen content on the cathode sides of individual fuel cells, which possibilities may be provided individually or cumulatively.

FIG. 2 is a basic view of an arrangement for changing the oxygen content at the cathode sides of the fuel cells of the fuel cell system 11. In this case, a totality of an air feeding device of this fuel cell system 11 has the reference number 20, while the exhaust system of the fuel cell system 11 has the reference number 30. A compressor 21 is provided in the air feeding device 20, which compressor 21 can, switchably by way of different intake paths, deliver air from the environment U by way of an air cooler 22 to the cathode sides of the individual fuel cells of the fuel cell system 11. In the first intake path of the compressor 21, a control valve 24 is provided and an air filter is connected to the input side of this control valve 24. In a second intake path parallel thereto, a control valve 26 is also provided, and a molecular sieve 27 (to be explained in detail) is provided in series with this control valve 26. Upstream of the compressor 21, an exhaust gas recirculation pipe 31, which branches off the exhaust gas system, extends into the air feeding device 20, in which exhaust gas recirculation pipe 31 a controllable valve 32 is provided, so that, by way of the above-mentioned control valves 24, 26, 32, the compressor 21 can feed a ratio of ambient air and exhaust gas of the fuel cell system to the cathode sides of the individual fuel cells of the fuel cell system 11, which ratio can be adjusted in a targeted manner.

When the fuel cell system 11 is operating and the valves 32 and 24 are at least partially open, the air flow fed to the cathode sides of the fuel cells contains, in addition to ambient air, also a certain amount of fuel cell exhaust gas which contains considerably less oxygen than ambient air. By the targeted adjustment of the delivery output of the compressor 21 and of the controllable valves 32 and 24, the amount of oxygen fed to the individual fuel cells can be adjusted. The voltage level U1 provided by the fuel cell system 11 can be changed in this manner. In addition, when the valve 32 is closed, the air throughput alone, i.e. the amount of the fed air at the cathode sides of the individual fuel cells, can be changed or adjusted in a desired manner also by the targeted adjustment of the delivery output of the compressor, and the above-mentioned voltage level U1 can thereby also be influenced.

With reference to the second intake path of the compressor 21 with the molecular sieve 27 provided in the air feeding device 20 and the control valve 26 connected to the output side, the controllable valves 24, 26 and 32 can, for example, be switched in such a manner that the compressor 21 takes in air from the environment U exclusively by way of this molecular sieve 27. In the molecular sieve 27, nitrogen molecules are preferably filtered out of the air flow, so that, by use of the molecular sieve 27, the oxygen content in the air flow fed to the cathode sides of the individual fuel cells can be increased, if the delivery output of the compressor 21 is correspondingly adapted.

An alternative or additional possibility for increasing the oxygen content in this fed air flow involves a storage device 23 for oxygen, which preferably is constructed as a short-term storage device and which is provided here in a bypass to the compressor 21. Upstream as well as downstream of the compressor 21, this short-term storage device 23, which may be formed, for example, by a suitable zeolite, can be connected by way of a valve 24a and 24b, respectively, with the air feeding device 20 or can be separated from the latter. When valve 24a, by way of which the intake side of the compressor 21 is connected with the storage device 23, is closed, and when the other valve 24b, by way of which the pressure side of the compressor 21 is connected with the storage device 23, is opened, the compressor 21 will deliver air into the short-term storage device 23, where—if the latter had previously been emptied—the oxygen contained therein can be absorbed, i.e. can be intermediately stored. When, at a later point in time, the valve 24a is opened upstream of the compressor and the valve 24b is then closed downstream of the compressor 21, when suitable pressure conditions are present, the compressor 21, essentially alone, takes in the oxygen stored in the short-term storage device 23 from the storage device 23 and feeds this oxygen, together with the air flow taken in from the environment U to the individual fuel cells of the fuel cell system 11. The nitrogen molecules which, during the preceding loading of the short-term storage device 23, were also stored in the latter, will be removed at a different point in time or by way of an exhaust air opening from the storage device 23 in order to subsequently be able to again fill the latter particularly with the desired oxygen molecules.

By use of such an oxygen enrichment of the air flow fed to the cathode sides of the fuel cells of the fuel cell system 11, which can additionally be influenced by way of the control valves 24 and/or 26 in a targeted manner, the output power of the fuel cell system 11 and thereby the voltage level U1 provided by the latter can be raised according to the demand. As a result, even more electric energy can be made available, for example, to the electric motor 12.

In addition, it is recommended that the electric voltage of all individual fuel cells of the fuel cell system 11 be monitored continuously with respect to maintaining the permissible limit values. An exceeding or falling-below of the permissible electric voltage is prevented by changing the reaction gas quantity (=quantity of oxygen and hydrogen) fed to the individual fuel cells of the fuel cell system 11.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A method of operating an electric system of a motor vehicle equipped with a fuel cell system, an accumulator, and an electric motor operable as a vehicle drive motor, the fuel cell system, accumulator and electric drive motor being electrically coupled to allow the fuel cell system to supply electric energy to the electric motor and the accumulator, and to allow the accumulator to supply electric energy to the electric motor, the method comprising the acts of:

designing the electric system, without an electric voltage converter and without an electric voltage conversion, such that the accumulator is essentially chargeable completely by the fuel cell system alone as well as also by the electric motor alone when operating as a generator;

depending on the electric voltage level made available by the fuel cell system and by the accumulator, and on the power required by the electric motor:

opening and closing a first switching element as needed, the first switching element being arranged between the fuel cell system and a node point that is electrically coupled to the accumulator and to the electric motor, and opening and closing a second switching element as needed, the second switching element being arranged between the accumulator and the node point, wherein the opening and closing of the first and second switching elements is such that the power requirement of the electric motor is met primarily by the fuel cell system and additionally in an auxiliary manner by the accumulator, and if the electric power made available by the fuel cell system exceeds the power demanded by the electric motor, the excess power of the fuel cell system resulting from a difference between the power made available and the power demanded is fed to the accumulator as long as an admissible charging current of the accumulator is not exceeded and the accumulator still has a defined residual storage capacity, the defined residual storage capacity being at least in an amount of a kinetic energy of the motor vehicle feedable to the accumulator in a current driving state of the vehicle by recuperation via the electric motor operating as the generator.

2. The method according to claim 1, wherein
in cases in which a voltage level provided by the fuel cell system is significantly higher than a voltage level processable by the electric motor and the accumulator, or significantly lower than the voltage level demanded by the electric motor or accumulator, adapting the voltage level of the fuel cell system to the demand by modulating an oxygen content on a cathode side of fuel cells of the fuel cell system, which fuel cell system has at least one hydrogen (air) oxygen fuel cell.

3. The method according to claim 2, wherein the act of adapting the voltage level of the fuel cell system to lower the voltage level of the fuel cell system as needed is carried out by:

changing a rate of exhaust gas returned to the cathode side of the fuel cell, and/or changing an air throughput at the cathode side of the fuel cell.

4. The method according to claim 2, wherein the act of adapting the voltage level of the fuel cell system to raise the voltage level of the fuel cell system as needed is carried out by:

increasing an oxygen content of an airflow flow fed to the cathode side of the fuel cell.

5. The method according to claim 3, wherein the act of adapting the voltage level of the fuel cell system to raise the voltage level of the fuel cell system as needed is carried out by:

increasing an oxygen content of an airflow flow fed to the cathode side of the fuel cell.

6. The method according to claim 4, wherein the increasing of the oxygen content of the airflow fed to the cathode side of the fuel cell is carried out by:

adding oxygen to the airflow, which oxygen was obtained in advance from fed air and stored in a suitable storage material, and/or reducing a nitrogen fraction in the airflow fed to the cathode side of the fuel cell, said reduction being carried out via a molecular sieve.

7. The method according to claim 5, wherein the increasing of the oxygen content of the airflow fed to the cathode side of the fuel cell is carried out by:

adding oxygen to the airflow, which oxygen was obtained in advance from fed air and stored in a suitable storage material, and/or reducing a nitrogen fraction in the airflow fed to the cathode side of the fuel cell, said reduction being carried out via a molecular sieve.

8. The method according to claim 1, wherein the fuel cell system has a plurality of individual fuel cells, the method further comprising the act of:

continuously monitoring the electric voltage of all the individual fuel cells in order to maintain permissible limit values, and preventing an exceeding or falling-below of the permissible limit values by changing a quantity of reaction gas fed to the individual fuel cells.

9. The method according to claim 2, wherein the fuel cell system has a plurality of individual fuel cells, the method further comprising the act of:

continuously monitoring the electric voltage of all the individual fuel cells in order to maintain permissible limit values, and preventing an exceeding or falling-below of the permissible limit values by changing a quantity of reaction gas fed to the individual fuel cells.

10. The method according to claim 3, wherein the fuel cell system has a plurality of individual fuel cells, the method further comprising the act of:

continuously monitoring the electric voltage of all the individual fuel cells in order to maintain permissible limit values, and preventing an exceeding or falling-below of the permissible limit values by changing a quantity of reaction gas fed to the individual fuel cells.

11. The method according to claim 4, wherein the fuel cell system has a plurality of individual fuel cells, the method further comprising the act of:

continuously monitoring the electric voltage of all the individual fuel cells in order to maintain permissible limit values, and preventing an exceeding or falling-below of the permissible limit values by changing a quantity of reaction gas fed to the individual fuel cells.

12. The method according to claim 6, wherein the fuel cell system has a plurality of individual fuel cells, the method further comprising the act of:

continuously monitoring the electric voltage of all the individual fuel cells in order to maintain permissible limit values, and preventing an exceeding or falling-below of the permissible limit values by changing a quantity of reaction gas fed to the individual fuel cells.

* * * * *